UNITED STATES PATENT OFFICE 2,562,408

ALIPHATIC OXY- AND MERCAPTOPHENYL-PENICILLINS

Otto K. Behrens, Reuben G. Jones, and Quentin F. Soper, Indianapolis, Ind., and Joseph W. Corse, Lafayette, Calif., assignors to Eli Lilly and Company, Indianapolis, Ind., a corporation of Indiana No Drawing. Application May 3, 1949, Serial No. 91,212

9 Claims. (Cl. 260—239.1)

This invention relates to antibiotic compounds and is directed to novel penicillins. This application is a continuation-in-part of our copending prior applications Serial No. 653,137, filed March 8, 1946, now Patent No. 2,479,296, and Serial No. 773,489, filed September 11, 1947, now abandoned.

There are certain known penicillins comprising a group of chemically related compounds which, under suitable conditions of growth, are produced as metabolic products by a penicillin-producing mold. The complete molecular structures of these compounds had not been definitely established when said prior applications were filed but sufficient elucidation of structure had been accomplished to allow the assignment to them of the following empirical formula:

$$R_0\text{—}C_{10}H_{13}N_2O_4S$$

wherein $R_0$ represents an organic radical which is characteristic of each individual penicillin.

These known penicillins comprise a group of penicillins of the foregoing formula including those wherein the $R_0$ radical represents a butene-1-yl, n-butyl, n-hexyl, phenyl or a p-hydroxyphenyl radical. It is known, furthermore, that in the normal fermentative production these known penicillins are formed in admixture.

The known penicillins thus identified, in view of further elucidation of the $C_{10}H_{13}N_2O_4S$ portion thereof, may be represented by the following formula:

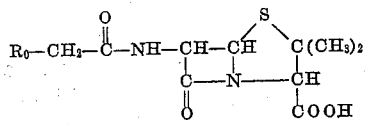

in which $R_0$ has the same meaning as set forth above.

We have made the surprising discovery that a penicillin-producing mold may be induced to produce a novel penicillin, by incorporating in the nutrient medium wherein the mold is grown, a selected organic compound, called herein a precursor compound. Such selected precursor compound, although foreign to the normal metabolic requirements of the mold, may be metabolized and incorporated in substantial part in the molecule of a novel penicillin. This result is especially surprising in view of the recognized specificity of the enzyme systems whereby lower organisms maintain growth and development. It is further surprising that use of a selected precursor compound may lead to the production of a novel penicillin to the substantial exclusion of the known and normally produced penicillins.

The present invention contemplates novel products of fermentative processes which comprise growing a penicillin-producing mold in association with a culture medium containing nutrient material and a selected precursor compound, said product as produced consisting essentially of a penicillin represented by the formula $$R\text{—}C_{10}H_{13}N_2O_4S$$

wherein R represents a heterogeneous-substituted phenyl radical in which the phenyl radical is monosubstituted with an aliphatic-oxy or aliphatic-mercapto substituent containing from 1 to 3 carbon atoms. Probably because of stearic hindrance, the substituent should be non-adjacent to the point of attachment of the phenyl nucleus, and is preferably at the p-position but may be at the m-position. The R of said formula may thus be represented by the radical:

$$R'\text{—}Y$$

in which Y is a di-valent element of group VI of the periodic table of elements and having a molecular weight below 33, i. e., oxygen and sulfur, R' is an aliphatic radical having a carbon chain of from 1 to 3 carbon atoms, and the R'—Y group is attached to the phenyl nucleus at a point non-adjacent to the 1-position thereof.

The R substituent of the new penicillin thus includes methoxyphenyl, ethoxyphenyl, propoxyphenyl, allyloxyphenyl, and the corresponding alkylmercaptophenyl and alkenylmercaptophenyl radicals.

The novel penicillins are ordinarily produced in the form of a salt, for example the sodium salt of the penicillin acid. The salt may be either the salt originally produced or a different salt to which the original product is transformed, and preferably is one of the salts ordinarily employed in the administration of the known penicillins, such as the common metal salts, for example, the sodium salt, the potassium salt, the ammonium salt, the calcium salt, etc.

According to the present knowledge of the structure of penicillin, the products of this application, as defined above, including both acids and salt thereof, may be represented by the following structural formula:

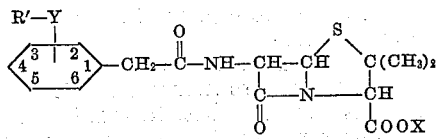

in which Y and R' have the same significance as before, and in which X represents hydrogen when the penicillin is in acid form and represents a salt-forming radical when the penicillin is in salt form, such salt-forming radicals including those customarily employed in penicillin production and therapy, such as potassium, sodium, calcium, ammonium, etc.

For convenience, we use below the empirical formula, e. g. $C_{10}H_{13}N_2O_4S$, as representing the molecular portion of the penicillin to which the substituted phenyl radical is attached.

The new penicillins may be named by reference to the particular substituted phenyl radical contained therein. Thus, for example, a penicillin wherein the substituted phenyl radical is the propoxyphenyl radical, is named propoxyphenyl-penicillin; and a penicillin wherein the substituted phenyl radical is the ethylmercaptophenyl radical, is named ethylmercaptophenyl-penicillin.

Broadly speaking, a method of producing a novel penicillin in accordance with this invention is as follows: There is provided a nutrient medium suitable for the growth of a penicillin-producing mold. To the nutrient medium is added in effective amount a precursor compound comprising an R-monosubstituted acetic acid—an R'-Y-phenyl acetic acid—or its equivalent. Precursor compounds useful for this purpose comprise monosubstituted acetic acids represented by the formula $$R—CH_2—COOH$$

wherein R has the same meaning as before. In place of the monosubstituted acetic acids, there may be used equivalents of such acetic acids, said equivalents comprising those compounds readily converted by the mold to the monosubstituted acetic acids. Such equivalents include simple derivatives of the acids such as their salts, esters, amides, and anhydrides, and may include other compounds, which the mold may convert to the monosubstituted acetic acids, such as ω-R-substituted, saturated straight-chain alcohols, amines, aldehydes, and acids containing an even number of carbon atoms, and the simple derivatives thereof.

The culture medium composition comprising nutrient material and precursor compound is inoculated with a penicillin-producing mold and the mold is grown under penicillin-producing conditions, during which growth a new penicillin is produced by the mold as a metabolic product. After mold growth, the mold mycelium is separated from the culture medium, and from the latter the novel penicillin is separated.

The isolation of the new penicillin may be effected by methods known to the art, such as adsorption and extraction, to obtain a product sufficiently pure for practical purposes. If a purer product is desired, the new penicillin may be subjected to additional methods of purification such as partition chromatography and elution, and recrystallization.

The novel penicillin desirably is recovered in the form of one of its salts, for example the sodium or potassium salt. Identification of the novel penicillin may be confirmed by methods known to the art, such methods comprising analysis, spectroscopic absorption, X-ray diffraction and antibacterial tests.

The nutrient material used in the composition wherein the mold is grown may comprise ingredients such as water, sugars, inorganic salts and desirably one or more indeterminate compositions such as corn steep amino acids and bran. Numerous suitable nutrient media comprising materials of the type mentioned are known to the art.

During the growth of the mold the culture medium comprising nutrient material and precursor compound is maintained at a suitable temperature, for example, in the range of 20–30° C. The range of temperature which has been found to be particularly suitable is from 24–26° C. The period of time during which the mold is grown will depend upon the objective desired. Thus the mold may be grown only during the period of its maximum rate of growth before mold growth is interrupted preliminary to isolating the new penicillin. Such a period generally is from 2 to 3 days. On the other hand, the mold may be grown for a longer period of time to obtain the maximum yield of new penicillin. In such a case, mold growth is usually continued for about 4 to 5 days.

The mold may be grown under various conditions. For example, the mold may be grown without agitation of the culture medium, in which case the mold grows on the surface of the medium. Alternatively, the culture medium may be agitated by shaking or stirring during the growth of the mold in which case the mold is dispersed throughout the culture medium and grows while so dispersed.

The molds suitable for the purposes of this invention are mold organisms of the type capable of producing penicillins. Such organisms include molds of the *Penicillium notatum-chrysogenum* group as well as certain molds of the Aspergillus group. It is to be understood that not all mold strains are equally efficient for the purposes of this invention. By way of example, mold strains suitable for the purposes of this invention are those known as strains X1612 and Q176 of the *Penicillium notatum-chrysogenum* group and strain G147 of the *Aspergillus flavus* group.

The concentration of the precursor compounds employed in the culture medium may vary over a substantial range. The precursor compounds may be present in the culture medium in concentrations of the order of about 1 percent, but it is usually desirable that smaller concentrations be employed since there is no particular advantage to be gained in employing concentrations in substantial excess of those necessary to produce the optimum effect. It appears at present that the optimum concentration of the monosubstituted acetic acids and derivatives thereof lies in the range of about 0.01 to about 0.05 percent on a weight volume basis when mold strain X1612 is used, and that this optimum concentration may range upwardly when mold strain Q-176 is used.

The precursor compound may be associated with the mold and culture medium at any suitable time. Thus the materials of the nutrient medium may be inoculated with the mold and the precursor compound to be employed may be incorporated either before or after inoculation of the culture medium with the mold.

The following specific examples further illustrate the invention.

*Example 1*

The sodium salt of p-methoxyphenyl-penicillin represented by the formula:

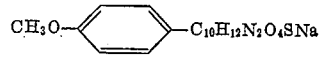

may be prepared in the following manner.

A culture medium is prepared in the following proportions:

| | | |
|---|---|---|
| Lactose | g-- | 125 |
| Corn steep solids | g-- | 100 |
| Calcium carbonate | g-- | 10 |
| N-(2-hydroxyethyl)-p-methoxy-phenylacetamide | g-- | 0.84 |
| Water | cc-- | 5,000 |

The culture medium is distributed in 200 cc. portions in 1 liter Erlenmeyer flasks, sterilized, inoculated with a spore suspension of Penicillium mold, strain N. R. R. L. 1976, and stoppered with cotton plugs. The flasks are maintained at a temperature of about 23–26° C. and shaken constantly for five days. The flask contents are then filtered to remove the mold mycelium, the filtrate cooled to about 0° C., acidified to about pH 2.2 with orthophosphoric acid and shaken with an equal volume of amyl acetate. The amyl acetate layer is separated and extracted with three successive 100 cc. portions of cold water to which cold N/10 sodium bicarbonate solution is added during the course of each extraction until a pH of about 7.0 to 7.3 is attained in the aqueous phase. The aqueous extracts are combined, cooled to about 0° C., acidified to about pH 2.2 with orthophosphoric acid and extracted successively with three 100 cc. portions of ether. The ether extracts are combined, and are passed through a chromatographic type silica adsorption column about 30 mm. in diameter and 250 mm. long and containing a pH 6.2 phosphate buffer. The silica column is developed by percolation with six 100 cc. portions of ether containing successively increasing amounts of methanol in the order of ½, 1, 1½, 2, 2½, and 3 percent.

The developed silica column is divided into about 12 equal sections and each section is eluted with three 30 cc. portions of M/15 phosphate buffer of pH 7.0. The eluates are assayed bacteriologically to determine their penicillin content. 79 percent of the total antibiotic activity possessed by all the eluates originates in a single band in the silica column and results from the presence of p-methoxyphenyl-penicillin. This band occupies a position similar to that in which penicillin G is found in comparable columns. Those eluates representing the sections of the silica column comprising this major, uniform band, are combined, cooled to about 0° C., acidified to about pH 2.2 and extracted with three 50 cc. portions of chloroform. The combined chloroform extracts are passed through a silica adsorption column containing a pH 6.2 phosphate buffer. This silica column is developed by percolation with three 150 cc. portions of chloroform containing successively increasing amounts of methanol in the order of 1, 2 and 3 percent. The developed silica column is then divided into 12 equal sections and each section is eluted with three 30 cc. portions of M/15 phosphate buffer of pH 7.0. Bacteriological assay shows that 92 percent of the total antibiotic activity originates in a single band in the silica column. The eluates obtained by extraction of the silica column sections which comprise this band are combined, cooled to about 0° C., acidified to about pH 2.2 and extracted with three 100 cc. portions of ether. The ether extracts are combined and extracted with about 75 cc. of a cold, dilute aqueous solution of sodium hydroxide to which N/10 sodium hydroxide is added during the course of the extraction so that a final pH of about 7.0 is attained in the aqueous phase. From the aqueous solution, the sodium salt of p-methoxyphenyl-penicillin may be separated by any suitable means, for example, by freezing and evaporation in vacuo from the frozen state.

The dry amorphous sodium salt of p-methoxyphenyl-penicillin is triturated with 1 cc. of acetone in which it almost completely dissolves but from which upon standing, it precipitates in crystalline form. The mixture is centrifuged and the sodium salt is washed with 5 cc. of absolute acetone. The sodium salt is obtained in purified form by solution in 1 cc. of 90 percent aqueous acetone and reprecipitation by the addition of 4 cc. of absolute acetone.

The sodium salt of p-methoxyphenyl-penicillin prepared according to the above procedure assayed about 1510 Oxford units per mg. when tested against Staph. aureus, strain 209 P. A differential assay carried out on Staph. aureus strain 209 P and B. subtilis strain N. R. R. L. B-558 gave a value of about 0.82. The optical rotation was found to be $$[\alpha]_D^{30°} = +278°$$

as a 0.3 percent solution in water. Analysis showed the presence of 52.51 percent carbon, 4.99 percent hydrogen and 7.20 percent nitrogen as compared with the calculated values of 52.86 percent carbon, 4.92 percent hydrogen and 7.25 percent nitrogen. A methoxyl determination gave a value of 7.9 as compared with a calculated value of 8.0.

*Example 2*

The sodium salt of p-methoxyphenyl-penicillin may also be prepared in the following manner.

A culture medium may be prepared in the following proportions:

| | | |
|---|---|---|
| Lactose | g-- | 125 |
| Corn steep solids | g-- | 150 |
| Calcium carbonate | g-- | 25 |
| p-Methoxyphenylacetic acid | g-- | 0.66 |
| Water | cc-- | 5,000 |

The culture medium is distributed in 200 cc. portions in 1 liter Erlenmeyer flasks, sterilized, inoculated with a spore suspension of Penicillium mold, strain X1612, and stoppered with cotton plugs. The flasks are maintained at a temperature of about 23–26° C. and shaken constantly for five days. The flask contents are then filtered to remove the mold mycelium. The p-methoxyphenyl-penicillin present in the filtrate may be isolated and purified according to the procedure described in Example 1.

The sodium salt of p-methoxyphenyl-pencillin thus prepared possesses the same characteristics and is identical with the p-methoxyphenyl-penicillin sodium salt prepared according to the procedure given in Example 1.

*Example 3*

The sodium salt of p-methoxyphenyl-penicillin may also be prepared by growing Pencillium mold, strain X1612, in a culture medium of the following composition:

| | | |
|---|---|---|
| Lactose | g-- | 125 |
| Corn steep solids | g-- | 150 |
| Calcium carbonate | g-- | 25 |
| Ethyl p-methoxyphenyl acetate | g-- | 0.77 |
| Water | cc-- | 5,000 |

The mold is grown in the culture medium and the p-methoxyphenyl-pencillin is isolated and purified according to the procedure described in Example 1.

The sodium salt of p-methoxyphenyl-pencillin thus obtained is identical with the p-methoxyphenyl-pencillin sodium salt obtained by the procedure described in Example 1.

Example 4

The sodium salt of p-methoxyphenyl-pencillin may also be prepared in the following manner:

A culture medium is prepared as shown in Example 3 except that in place of the 0.77 g. of ethyl-p-methoxyphenylacetate there is employed 2.5 g. of p-methoxyphenylethylamine. The culture medium is distributed in 200 cc. portions in 1 liter flasks, sterilized, and inoculated with a spore suspension of Penicillium mold, strain X1612. The growth of the mold and isolation and purification of the p-methoxyphenyl-pencillin are carried out according to the procedure described in Example 1.

The sodium salt of p-methoxyphenyl-penicillin thus obtained is identical with that obtained by the procedure described in Example 1.

Example 5

The sodium salt of p-allyloxyphenyl-penicillin, represented by the formula

can be prepared as follows:

Example 1 is repeated save that instead of N-(2-hydroxyethyl)-p-methoxyphenylacetamide, the precursor used is N-(2-hydroxyethyl)-p-allyloxyphenylacetamide, in the proportion of 0.19 g. per liter of culture medium. Recovery and purification is done by the procedure of Example 1, and a final step in the purification may be as follows:

The dried sodium salt of the p-allyloxyphenyl-penicillin is crystallized by treatment with absolute acetone, washed several times with acetone, and is recrystallized from 90 percent aqueous acetone by adding 4 volumes of absolute acetone. p-Allyloxyphenyl-penicillin purified by two such recrystallizations assayed 1440 units per mg. and gave a differential assay value of 0.87. Its ultraviolet absorption curve was in good agreement with that observed for the precursor. Analysis showed the presence of 55.78 percent carbon, 5.20 percent hydrogen, and 6.86 percent nitrogen, as compared with calculated values of 55.33 percent carbon, 5.14 percent hydrogen and 6.79 percent nitrogen.

Example 6

The preceding examples are repeated, save that other precursors are used and corresponding other hetero-substituted-phenyl penicillins are produced. Other new penicillins which are thus prepared, and precursors include the following:

| New Penicillins | Precursors for the New Penicillins |
| --- | --- |
| m-methoxyphenyl-penicillin | N-(2'-hydroxyethyl)-m-methoxyphenyl acetamide |
| p-ethoxyphenyl-penicillin | N-(2-hydroxyethyl)-p-ethoxy-phenyl acetamide |
| p-(β,γ-dihydroxypropoxy)-phenyl-penicillin | N-(2-hydroxyethyl)-p-(β-γ-dihydroxypropoxy)-phenyl acetamide |

Example 7

The sodium salt of p-methylmercaptophenyl-penicillin, represented by the formula

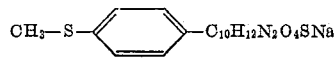

can be prepared as follows:

A culture medium is prepared in the following proportions:

| | | |
| --- | --- | --- |
| Lactose | g | 125 |
| Corn steep solids | g | 100 |
| Calcium carbonate | g | 10 |
| Water | cc | 5,000 |

To this mixture there is added as the precursor about 0.9 g. of N-(2-hydroxyethyl)-p-methylmercapto-phenylacetamide (which may be prepared by heating ethanolamine with p-methylmercapto-phenyl acetic acid).

The culture medium containing the precursor is distributed in 200 cc. portions in 1 liter Erlenmeyer flasks, sterilized, inoculated with a spore suspension of Penicillium mold, strain N. R. R. L. 1976, and stoppered with cotton plugs. The flasks are maintained at a temperature of about 23–26° C. and shaken constantly for five days. The flask contents are then filtered to remove the mold mycelium, the filtrate cooled to about 0° C., acidified to about pH 2.2 with orthophosphoric acid and shaken with an equal volume of amyl acetate. The amyl acetate layer is separated and extracted with three successive 100 cc. portions of cold water to which cold N/10 sodium bicarbonate solution is added during the course of each extraction until a pH of about 7.0 to 7.3 is attained in the aqueous phase. The aqueous extracts are combined, cooled to about 0° C., acidified to about pH 2.2 with orthophosphoric acid and extracted successively with three 100 cc. portions of ether. The ether extracts are combined, and are passed through a chromatographic type silica adsorption column about 30 mm. in diameter and 250 mm. long and containing a pH 6.2 phosphate buffer. The silica column is developed by percolation with six 100 cc. portions of ether containing successively increasing amounts of methanol in the order of ½, 1, 1½, 2, 2½, and 3 percent.

The developed silica column is divided into about 12 equal sections and each section is eluted with three 30 cc. portions of M/15 phosphate buffer of pH 7.0. The eluates are assayed bacteriologically to determine their penicillin content. Most of the antibiotic activity is found in a single band in the silica column and results from the presence of p-methylmercaptophenyl-penicillin. The eluates from this major band are combined, cooled to about 0° C., acidified to about pH 2.2 and extracted with three 50 cc. portions of chloroform. The combined chloroform extracts are passed through a silica adsorption column containing a pH 6.2 phosphate buffer. This silica column is developed by percolation with three 150 cc. portions of chloroform containing successively increasing amounts of methanol in the order of 1, 2 and 3 percent. The developed silica column is then divided into 12 equal sections and each section is eluted with three 30 cc. portions of M/12 phosphate buffer of pH 7.0.

Most of the antibiotic activity originates in a single band in the silica column. The eluates obtained by extraction of this band are combined, cooled to about 0° C., acidified to about pH 2.2 and extracted with three 100 cc. portions of ether. The ether extracts are combined and extracted with about 75 cc. of a cold, dilute aqueous solution of sodium hydroxide to which N/10 sodium hydroxide is added during the course of the extraction so that a final pH of about 7.0 is attained in the aqueous phase. From the aqueous solution, the sodium salt of p-methylmercaptophenyl-penicillin is separated by any suitable means, for example by freezing and evaporation in vacuo from the frozen state.

*Example 8*

Example 7 is repeated save that instead of using a precursor in which the phenyl substituent is the p-methylmercaptophenyl radical, other precursors are used which contain other alkylmercaptophenyl substituents, and instead of producing p-methylmercaptophenyl-penicillin, other alkylmercaptophenyl-penicillins are produced corresponding to the precursor used. Other new penicillins which are thus prepared, and precursors for their preparation, include the following:

| New Penicillin | Precursors for the New Penicillins |
| --- | --- |
| m-methylmercaptophenyl-penicillin | N-(2-hydroxyethyl)-m-methyl-mercaptophenyl acetamide |
| p-ethylmercaptophenyl-penicillin | N-(2-hydroxyethyl)-p-ethylmercaptophenyl acetamide |
| p-allylmercaptophenyl-penicillin | N-(2-hydroxyethyl)-p-allylmercaptophenyl acetamide |

*Example 9*

The new pencillins obtained in the form of their sodium salts may be converted to other salts in a number of ways. One way is as follows: An aqueous solution of the sodium salt, acidified to about pH 2, is extracted with an equal volume of an organic solvent, such as amyl acetate, ether, chloroform, or the like. The organic solvent solution, containing the new penicillin in acid form, is extracted with an aqueous solution containing the cation of the desired salt, for example, a solution of potassium hydroxide, calcium phosphate, ammonium hydroxide, or the like, at about pH 8.5. The aqueous extract contains the penicillin as the corresponding salt, for example, the potassium salt, the calcium salt, or the ammonium salt of the penicillin, and such salt is suitably recovered from the solution, as by drying in vacuo from the frozen state.

We claim as our invention:

1. A compound of the group consisting of a new penicillin acid and its sodium, potassium, calcium and ammonium salts, said acid being represented by the formula

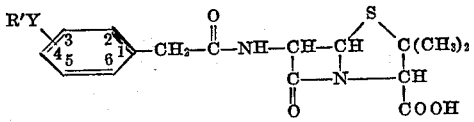

in which R' is an aliphatic hydrocarbon radical having from 1 to 3 carbon atoms, Y is a member of the group consisting of sulfur and oxygen, and the R'-Y group is attached to one of the positions 3, 4 and 5 in the benzene ring.

2. A new penicillin represented by the formula

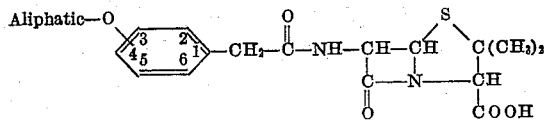

in which "aliphatic" is an aliphatic hydrocarbon radical having from 1 to 3 carbon atoms and the aliphatic-O group is attached to one of the positions 3, 4 and 5 of the benzene ring.

3. A new penicillin represented by the formula

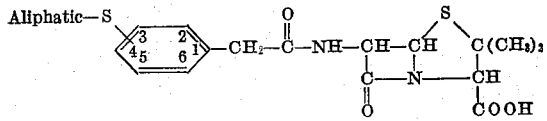

in which "aliphatic" is an aliphatic hydrocarbon radical having from 1 to 3 carbon atoms, and the aliphatic-S group is attached to one of the positions 3, 4 and 5 of the benzene ring.

4. A new penicillin represented by the formula

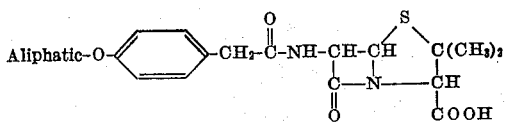

in which "aliphatic" is an aliphatic hydrocarbon radical having from 1 to 3 carbon atoms.

5. A new penicillin represented by the formula

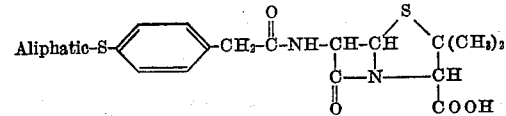

in which "aliphatic" is an aliphatic hydrocarbon radical having from 1 to 3 carbon atoms.

6. p-Methoxyphenyl-penicillin.
7. p-Methylmercaptophenyl-penicillin.
8. p-Allyloxyphenyl-penicillin.
9. p-Ethoxyphenyl-penicillin.

OTTO K. BEHRENS.
REUBEN G. JONES.
QUENTIN F. SOPER.
JOSEPH W. CORSE.

REFERENCES CITED

The following references are of record in the file of this patent:

UNITED STATES PATENTS

| Number | Name | Date |
| --- | --- | --- |
| 2,479,296 | Behrens et al. | Aug. 16, 1949 |